Jan. 8, 1963

C. H. CHANDLER 3,072,855

INTERFERENCE REMOVAL DEVICE WITH REVERTIVE AND PROGRESSIVE GATING MEANS FOR SETTING DESIRED SIGNAL PATTERN

Filed Feb. 3, 1959

INVENTOR.
CHARLES H. CHANDLER
BY Wade Koontz
ATTORNEY and
Richard J. Killoren
AGENT United States Patent Office 3,072,855
Patented Jan. 8, 1963

3,072,855
INTERFERENCE REMOVAL DEVICE WITH REVERTIVE AND PROGRESSIVE GATING MEANS FOR SETTING DESIRED SIGNAL PATTERN

Charles H. Chandler, Princeton, N.J., assignor to the United States of America as represented by the Secretary of the Air Force Filed Feb. 3, 1959, Ser. No. 790,987
2 Claims. (Cl. 328—165)

This invention relates to a device for removing interference from a pulse signal in apparatus such as pulse navigation systems.

One object of the invention is to provide a device for removing all or most of the interference from a pulse signal, wherein a gating pattern is set up so that only those pulses which were present in substantially the same position in the previous period will be passed.

Another object is to provide a device for removing substantially all of the interference from a pulse signal which will provide some leeway for a small amount of change of the time position of the signal pulse within the period.

These and other objects will be more fully understood from the following detailed description taken with the drawing wherein.

Figure 1:
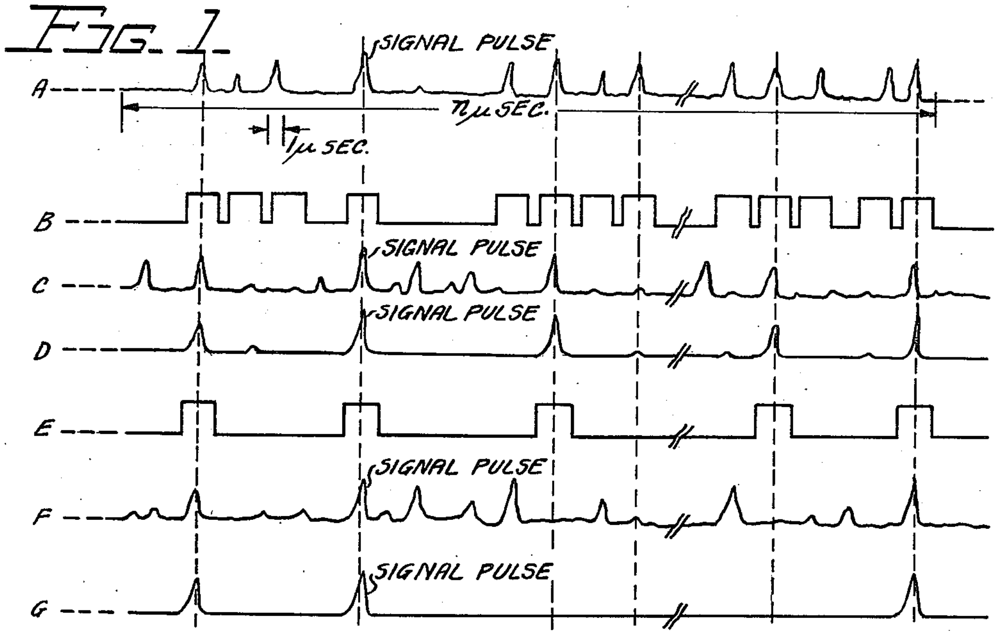
FIG. 1 shows a plurality of waveforms for succeeding pulse intervals and gate signals produced therefrom.

In the device of this invention, a gating pattern is set up such that only those pulses of any pulse repetition period will be passed which were also present and occupying substantially the same location in the preceding period. In this application the entire signal applied at the input 10 shall be called the pulse signal and the pulses which are desired to be retained in the output of the device of this invention shall be called signal pulses. This action is illustrated in FIG. 1 wherein a first pulse repetition period *n* microseconds long is shown in waveform A. A large number of pulses including a desired signal pulse are shown in this waveform. According to this invention, each pulse which exceeds some predetermined minimum amplitude is made to form a gate pulse. A gate pulse waveform produced from the signal of waveform A is shown in waveform B of FIG. 1. The gate pulses should be somewhat wider than the signal pulses so as to provide some leeway on both sides of the signal pulse which will permit the tracking of pulses which move about within the repetition interval. To provide gating pulses which provide such leeway on both sides of the signal pulse, the gate pulses or the signals used to form these pulses are delayed a little less than one period before they are applied to the gate circuit. For example, in a system having a repetition period equal to *n* microseconds, the delay can be made equal to $n-1$ microseconds and the gate pulses are standardized at two microseconds in width so that signal pulses up to one microsecond may be accommodated with some leeway on either side. The gate period is determined by the leeway required and the accuracy of the delay system.

Figure 2:
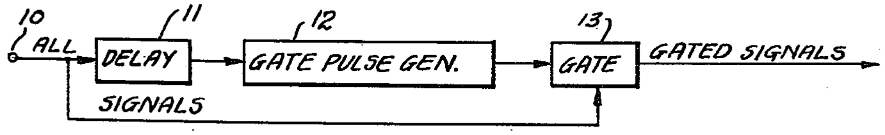
FIG. 2 is a block diagram of a pulse gating system according to one embodiment of the invention.

Referring now to FIG. 2 of the drawing, the pulse signal, which includes the signal pulses and the interference pulses, is applied to input 10 of the pulse interference reducing system. This signal is applied to a delay device 11. This delay device may be any type of device which provides a constant and accurate delay such as a magnetic drum or a fused quartz ultrasonic delay line. The output of the delay line is applied to a gate pulse generator 12 which produces a gate pulse of the desired width. The gate pulse is applied to a gate circuit 13. The pulse signal applied to delay device 11 is also applied to the gate circuit 13. In the operation of the device, if a signal such as shown in waveform A of FIG. 1 is applied to the delay device 11 and then to pulse generator 12, a delayed gate pulse signal such as shown in waveform B will be produced. Then, if the signal for the next succeeding pulse repetition period is as shown in waveform C of FIG. 1, the output of the gate 13 will be as shown in waveform D of FIG. 1. As can be seen, some of the interference has been removed from the signal.

Figure 3:
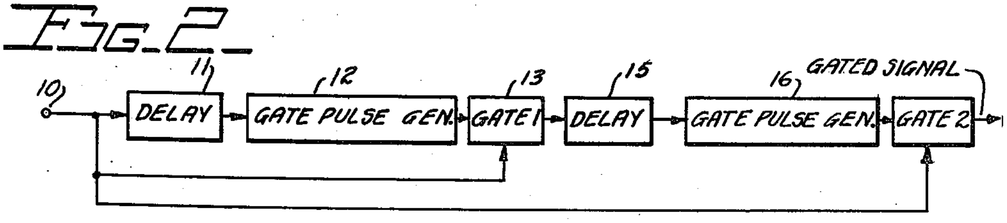
FIG. 3 is a block diagram of a modification of the pulse gating system of FIG. 1 having a plurality of gate operations.

As shown in FIG. 3, successive gating operations may be provided to further eliminate interference signals. The circuit elements corresponding to those in FIG. 1 are given like reference numerals. In this device, the output of gate 13 is applied to a second delay line 15 and to a second gate pulse generator 16. The delayed gate signal applied to the second gate circuit 17 is shown in waveform E of FIG. 1. A signal waveform such as shown in waveform F for the second succeeding interval will produce an output in gate circuit 17 such as shown in waveform G of FIG. 1. It is obvious that more gating systems may be used to provide added discrimination against noise and random pulses. This system, however, will be unable to remove unwanted pulses which appear at about the same time location within successive pulse periods.

Figure 4:
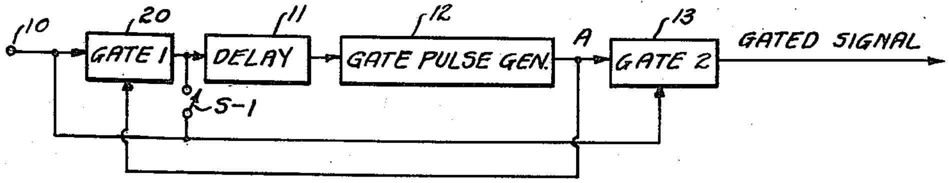
FIG. 4 is a block diagram of a further modification of the pulse gating system of FIG. 1 which provides a lockout of all signals except the desired signals.

In the device of FIG. 4, a definite gate pattern is set up in the system. Once this gate pattern is set up all pulse signals not provided for in this pattern will be locked out of the system. This system is the same as the system of FIG. 2 except that an additional gate 20 is provided between the terminal 10 and the delay device 11. Switch S–1 is provided to set up the gating pattern. In the operation of this device, a signal applied to terminal 10 cannot pass through gate 20 and will, therefore, be applied to delay device 11 through switch S–1 and to gate 13 in the the same manners as in the operation of the device of FIG. 2. After one complete gating pattern is stored in delay device 11, switch S–1 may be opened manually or automatically by the first gate signal from the output of gate pulse generator 12. Thereafter, the only signals arriving at delay device 11 will be those that are permitted to pass gate 20. Thus, no new gate signals will be produced after switch S–1 is opened. With this system, the signal pulses are allowed to move about in time since each successive gate pulse pattern is set up by the gated pulse and not by the gating pulse. If desired pulses are lost, switch S–1 may be closed to again provide for these pulses. It is obvious that the gate pulse for gate 20 may be obtained from a gate pulse generator connected between the output of gate 13 and gate 20 if desired.

While the delay device has been shown as preceding the gate pulse generator in each of the embodiments, it is obvious that these may be reversed if desired.

The gating pattern could also be inserted into the system by means of a received code signal, which has been decoded and applied to gate 20.

There is thus provided a device for removing interference from a pulse signal in apparatus such as a pulse-navigation system.

While certain specific embodiments have been described in some detail, it is obvious that numerous changes may be made without departing from the general principles and scope of the invention.

I claim:

1. A device for removing interference from a pulse signal having signal pulses and interference, comprising; a delay means, a first gate circuit connected between the pulse signal source and said delay means, a switch connected in shunt with said first gate circuit between said signal source and said delay means, means for producing a gate pulse of substantially greater width than said signal pulses in said pulse signal, means for connecting the output of said delay means to said gate pulse producing means, a second gate circuit, means for applying said pulse signal to said second gate circuit, means for applying the output of said gate pulse producing means to said second gate circuit to pass the pulse signal only during the gate pulse interval, means for connecting the output of said gate pulse producing means to said first gate circuit to pass said pulse signal to said delay circuit only during the gate pulse interval.

2. A device for removing interference from a pulse signal having a signal pulses and interference wherein said pulse signal has a predetermined pulse repetition interval, comprising: a delay circuit; means, connected to the output of said delay circuit, for producing a gate pulse of substantially greater width than said signal pulses in said pulse signal; a first gate circuit; means for connecting the output of said gate pulse producing means to said first gate circuit; a second gate circuit connected in the input circuit of said delay circuit; means for applying said pulse signal to said first and second gate circuits; means, connected between said last-named means and said delay circuit, for selectively bypassing said second gate circuit and means for applying the output of said gate pulse producing means to said second gate circuit.

References Cited in the file of this patent

UNITED STATES PATENTS

| | | |
|---|---|---|
| 2,361,437 | Trevor | Oct. 31, 1944 |
| 2,412,974 | Deloraine | Dec. 24, 1946 |
| 2,502,454 | Greig | Apr. 4, 1950 |
| 2,959,737 | Simopoulos | Nov. 8, 1960 |